United States Patent
Hanaoka

(10) Patent No.: US 10,447,570 B2
(45) Date of Patent: Oct. 15, 2019

(54) METHOD AND APPARATUS TO MANAGE INSUFFICIENT DATA IN DISTRIBUTED ANALYTICS SYSTEM

(71) Applicant: Hitachi, Ltd., Chiyoda-ku, Tokyo (JP)

(72) Inventor: Miyuki Hanaoka, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 50 days.

(21) Appl. No.: 15/752,828

(22) PCT Filed: Dec. 30, 2015

(86) PCT No.: PCT/US2015/068195
§ 371 (c)(1),
(2) Date: Feb. 14, 2018

(87) PCT Pub. No.: WO2017/116450
PCT Pub. Date: Jul. 6, 2017

(65) Prior Publication Data
US 2019/0007295 A1    Jan. 3, 2019

(51) Int. Cl.
*H04L 12/26* (2006.01)
*H04W 24/08* (2009.01)
*H04W 24/04* (2009.01)

(52) U.S. Cl.
CPC ......... *H04L 43/0894* (2013.01); *H04W 24/04* (2013.01); *H04W 24/08* (2013.01)

(58) Field of Classification Search
CPC ............. H04L 43/0894; H04L 67/1008; H04L 67/101; H04L 67/1002; H04L 67/1097; H04L 67/1021; H04L 67/1012; H04L 67/1091; H04L 67/1023; H04W 24/08; H04W 24/04; H04M 3/2236; H04M 2201/18; H04M 2207/18; H03M 13/37; H03M 13/3761; G06F 16/1834; G06F 16/70

See application file for complete search history.

(56) References Cited

U.S. PATENT DOCUMENTS

| | | | |
|---|---|---|---|
| 8,947,539 B2 * | 2/2015 | Lee | H04N 17/004 348/193 |
| 2006/0252376 A1 * | 11/2006 | Fok | H04M 3/2236 455/67.13 |
| 2014/0240522 A1 * | 8/2014 | Lee | H04N 17/004 348/193 |
| 2014/0281755 A1 | 9/2014 | Kantareddy et al. | |

FOREIGN PATENT DOCUMENTS

| | | |
|---|---|---|
| WO | 2010054101 A1 | 5/2010 |
| WO | 2012143939 A2 | 10/2012 |
| WO | 2015157851 A1 | 10/2015 |

* cited by examiner

*Primary Examiner* — Jung Liu
(74) *Attorney, Agent, or Firm* — Procopio, Cory, Hargreaves & Savitch LLP

(57) ABSTRACT

The present disclosure discloses method and apparatus to manage insufficient data targeted for partially distributed and partially centralized analytics in mobile or internet of things (IoT) environment. The present disclosure also discloses method and apparatus to get more accurate data if sent data does not have enough accuracy to the certain analytics.

14 Claims, 13 Drawing Sheets

METHOD AND APPARATUS TO MANAGE INSUFFICIENT DATA IN DISTRIBUTED ANALYTICS SYSTEM

BACKGROUND

Field

The present disclosure is generally directed to data collection systems, and more specifically, to the application of analytics to data collection systems.

Related Art

In related art systems, analytics is utilized in applications for business and social infrastructure such as business intelligence, customer marketing, efficient system operations, and so on. Most of the analytics architecture is both distributed and centralized, which allows related art implementations to collect data at the edge and analyze the data at both the edge and the center of the data collection system. Each stage involves different analytics depending on its business needs. For example, edge analytics may involve local analytics to cover only certain areas of the data collection system to provide immediate feedback to the equipment, whereas central analytics may involve more aggregated business related analytics. Even central analytics should be conducted in near-real-time to take action based on current state.

In recent demands for analytics for the mobile and IoT (internet-of-things) environment, the data collection system may not be able to guarantee that all the data arrives in real-time to the central system. The data arrival depends on the load of the sensor device and network condition. If the system waits for all of the data to be collected before analytics is conducted, real-time analytics cannot be performed. To process in real-time, the system can proceed with the partial data received (e.g. after a certain time has elapsed or a certain amount of data is received). However, analytics based on partially received data may lead to the propagation of results based on insufficient data. The analytics at the central system is based on the interim result from the edge-side, which can be based on incomplete data. If the interim result is not sufficiently accurate for the central analytics, inaccurate analytics results may be propagated.

Related art implementations can involve mechanisms for identifying failed components during the data collection. For each data source combination in a plurality of data sources, a determination is made as to whether a standard deviation for an estimated collection interval of the data source is above a predetermined standard deviation threshold. In response to the standard deviation for the estimated collection interval of the data source being above the predetermined standard deviation threshold, an error signal is generated indicating an error in data collection with the data source. An example of such an related art system can be found, for example, at US Patent Application No. 2014/0281755, the contents of which is hereby incorporated by reference in its entirety for all purposes.

SUMMARY

In related art implementations, there are mechanisms for identifying errors during data collection, but not for managing error propagation.

Aspects of the present disclosure can include a system, which can involve one or more first apparatuses, each of the one or more first apparatuses comprising a first processor configured to conduct analytics on received streamed data to produce first analytics results; calculate a confidence score for the first analytics results based on the received streamed data; and stream the first analytics results and the confidence score of the first analytics results to a second apparatus; and a second apparatus, which can involve a second processor, configured to conduct analytics on the streamed first analytics results for an analytics condition of the streamed first analytics results being met to generate second analytics results.

Aspects of the present disclosure further include a method, which can involve for one or more first apparatuses, conducting analytics on received streamed data to produce first analytics results; calculating a confidence score for the first analytics results based on the received streamed data; and streaming the first analytics results and the confidence score of the first analytics results to a second apparatus; and for the second apparatus, conducting analytics on the streamed first analytics results for an analytics condition of the streamed first analytics results being met to generate second analytics results.

Aspects of the present disclosure further include a system, which can involve for one or more first apparatuses, means for conducting analytics on received streamed data to produce first analytics results; means for calculating a confidence score for the first analytics results based on the received streamed data; and means for streaming the first analytics results and the confidence score of the first analytics results to a second apparatus; and for the second apparatus, means for conducting analytics on the streamed first analytics results for an analytics condition of the streamed first analytics results being met to generate second analytics results.

DETAILED DESCRIPTION

Figure 1:
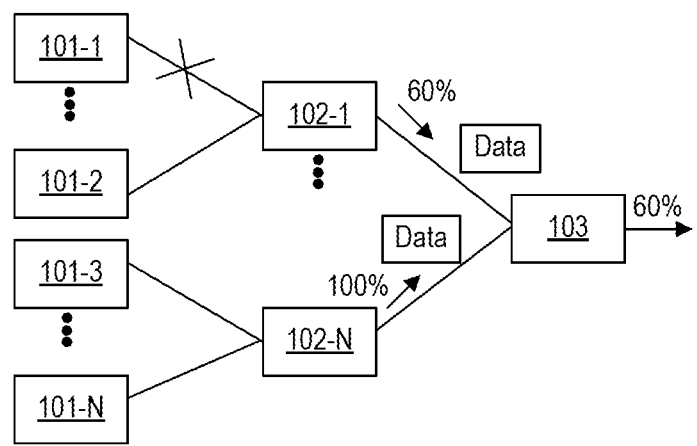
FIG. 1 illustrates an example of distributed analytics.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The terms "request" and "operation" may also be used interchangeably.

In an example implementation described below, the system is configured to manage insufficient analytics result propagation and how to recover from such propagation.

FIG. 1 illustrates an example of distributed analytics. Specifically, the example illustrates mobile network analytics, however, example implementations described herein can also apply to any analytics system having a system architecture. In this example, mobile devices 101-1, 101-2, 101-3, and 101-N measure data that indicate the current status of the mobile devices, such as radio strength or traffic volume. The mobile devices 101-1, 101-2, 101-3, and 101-N sends the data to associated cell tower 102-1, 102-N, and each cell tower can analyze the data to understand the status of the cell tower 102-1, 102-N and its connectivity. For example, the cell tower 102-1, 102-N calculates the number of users connecting to the cell tower, or the data flow. Based on the result, the cell tower 102-1, 102-N can provide the result to local operator, trigger alerts, or even feedback to the equipment such as changing configuration. This kind of analytics is required to be done in real-time.

Each cell tower 102-1, 102-N sends the results of analysis to the central system 103 for more advanced analytics. Sending all the raw data sent by mobile device is normally avoided because of the large network bandwidth requirement. Thus, cell towers send only aggregated data to centralized analytics system.

In the mobile or IoT environment, there may be situations where the mobile device or sensor cannot send the data in reliable way. For example, the data is sometimes not delivered to the next hop when the network is disconnected or the device is overloaded. If the system waits for the arrival of all the data before analytics, then the system cannot analyze the data in real-time. To analyze data in real-time, there are implementations wherein the system proceeds with partially received data (e.g., as after certain time elapsed or certain number of data received). However, this may lead to propagation of results based on insufficient data.

Analytics at the central system is based on the interim result from the edge-side, which can be based on incomplete data. If the interim result is not sufficient for the central analytics to provide accurate analytics within the desired threshold (e.g. confidence level), inaccurate analytics results are produced. In the example of FIG. 1, the bottom cell tower 102-N gets data from all of the associated mobile devices, but the top cell tower 102-1 may not receive data from some of the mobile devices. If both cell towers send the result to central system and the central system uses the data for the analytics, then the result can be inaccurate. The hierarchy in this example has only two levels of depth, but more than two levels can be involved.

Another example for such an environment can involve a connected car. In a connected car example, each car has its own analytics inside the car and feedback to the car or passengers, but the car also connects with other cars for exchanging data or sending data to local/central data center for some other analytics.

Figure 2:
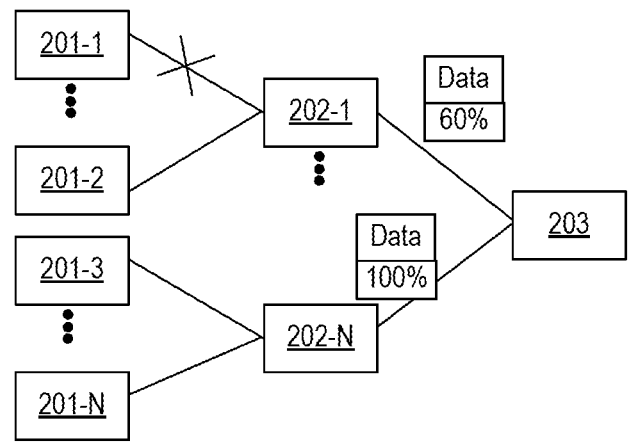
FIG. 2 illustrates example data sent by the analytics system, in accordance with an example implementation.

FIG. 2 illustrates example data sent by the analytics system, in accordance with an example implementation. In the example implementation as depicted in FIG. 2, there are mobile devices 201-1, 201-2, 201-3, 201-N, cell towers 202-1, 202-N and network operation center 203. Mobile devices 20a-1, 201-2, 201-3, 201-N can conduct measurements such as radio strength, traffic volume, and so on. Cell tower 202-1, 202-N can conduct analytics on received data or analytics results from mobile devices 201-1, 201-2, 201-3, 201-N for pertinent cell tower analysis such as number of users, congestion level, and so on. Network operation center 203 can be configured to conduct advanced analytics across managed cell towers 202-1, 202-N such as interference levels between cell towers.

In addition to data itself, the sending side can add a "confidence score" to the interim result so that the receiver can judge if the analytics can proceed based on the interim result. The confidence score can be configurable based on the analytics type of the sender side. For example, the data arrival rate can use used as confidence score. If the cell tower receives data from all the associated mobile devices, the score is 100%. If data is received from only half of the mobile devices, the confidence score is 50%. The confidence score can be any number as defined by user and it is not necessarily to be percentage. Depending on the desired implementation, another example for the confidence score can be all or nothing, i.e., 1 if at least 70% of data received and 0 if not. The variance or the standard deviation can be also used depending on the desired implementations. If the receiver sends the analytics result to another system, the receiver can also add the confidence score to its result. The score can be also configured by the user having an understanding of the analytics because the analytics depends on the analytics algorithm. In simple case, it can be average, minimum, or maximum of confidence score it receives, but it can be more complex calculation.

The receiver (in this case, the network operations center or NOC 203) can decide whether it can proceed the analytics with received data. In this example, if all the data has more than a 70% confidence score, the NOC 203 proceeds with the analytics. Otherwise, the NOC 203 can wait for additional data or request data. This condition can also be configured by the user having enough knowledge about the analytics algorithm and can determine what accuracy of data is needed. The condition can be according to the desired implementation.

In example implementations, some data can have some loss tolerance while other data may have no tolerance. For example, the data to identify the user or device such as user ID or device ID has no loss tolerance as the specific data is needed. In contrast, statistical data such as the number of users or the average packet size has some loss tolerance and sets of data can be utilized in lieu of obtaining all of the individual data. When data is processed, such data should be distinguished and the confidence score can be used as a hint.

Figure 3:
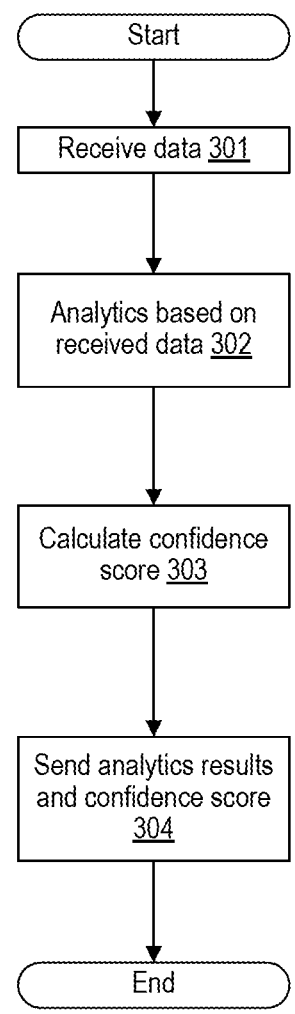
FIG. 3 illustrates a flow diagram for leaf analytics, in accordance with an example implementation.

FIG. 3 illustrates a flow diagram for leaf analytics, in accordance with an example implementation. In the leaf analytics system, the flow receives data directly from the data collector (such as mobile device or sensor), not from the other analytics system. The flow receives the data at 301 from data collector (e.g., mobile device or sensor). At 302, the flow analyzes data and takes an action according to the desired implementation. At 303, the flow calculates confidence score for the analyzed result. At 304, the flow sends the result and confidence score. In the example of mobile network case as described in FIG. 1, the result can be the number of users connected to the cell tower and confidence score is arrival rate of the data.

Figure 4:
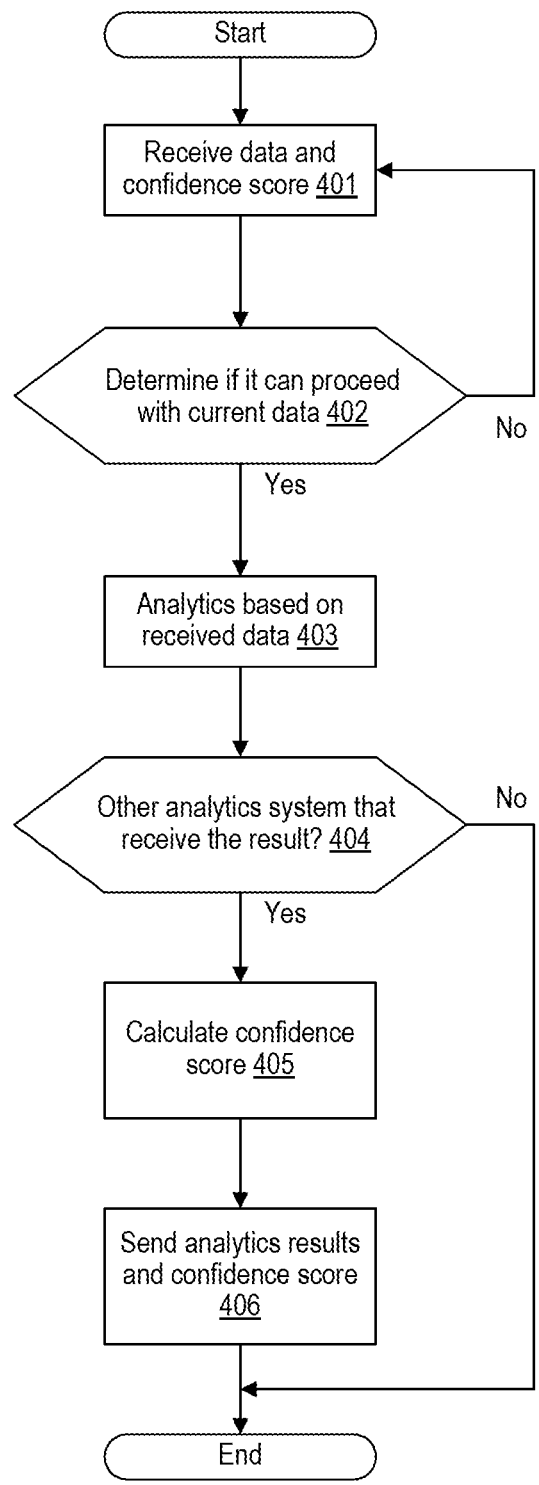
FIG. 4 illustrates the flow diagram for the non-leaf of the analytics tree, in accordance with an example implementation.

FIG. 4 illustrates the flow diagram for the non-leaf of the analytics tree, in accordance with an example implementation. Non-leaf analytics is the analytics system which receives data with a confidence score from another analytics system. The non-leaf analytics can also receive the data directly from a data collector (e.g., mobile device or sensor) without a confidence score, depending on the desired implementation.

At 401, the flow receives data and the confidence score if included. At 402, based on a user defined condition, the flow determines if the current received data is enough to proceed the analytics. If yes, the flow proceeds to the analytics at 403. If not, then the flow waits for an additional data arrival at 401. After the flow conducts the analytics, the flow proceeds to 404 to determine if it needs to send the result to another analytics system. If yes, then the flow calculates the confidence score at 405 and sends the result and score to another system at 406. For example, the confidence score can be the minimum of the confidence score received from the upstream analytics system. If no, then the flow ends.

In an example implementation, there is a variation of flows when the system does not receive data with enough confidence to proceed with the analytics.

Figure 5:
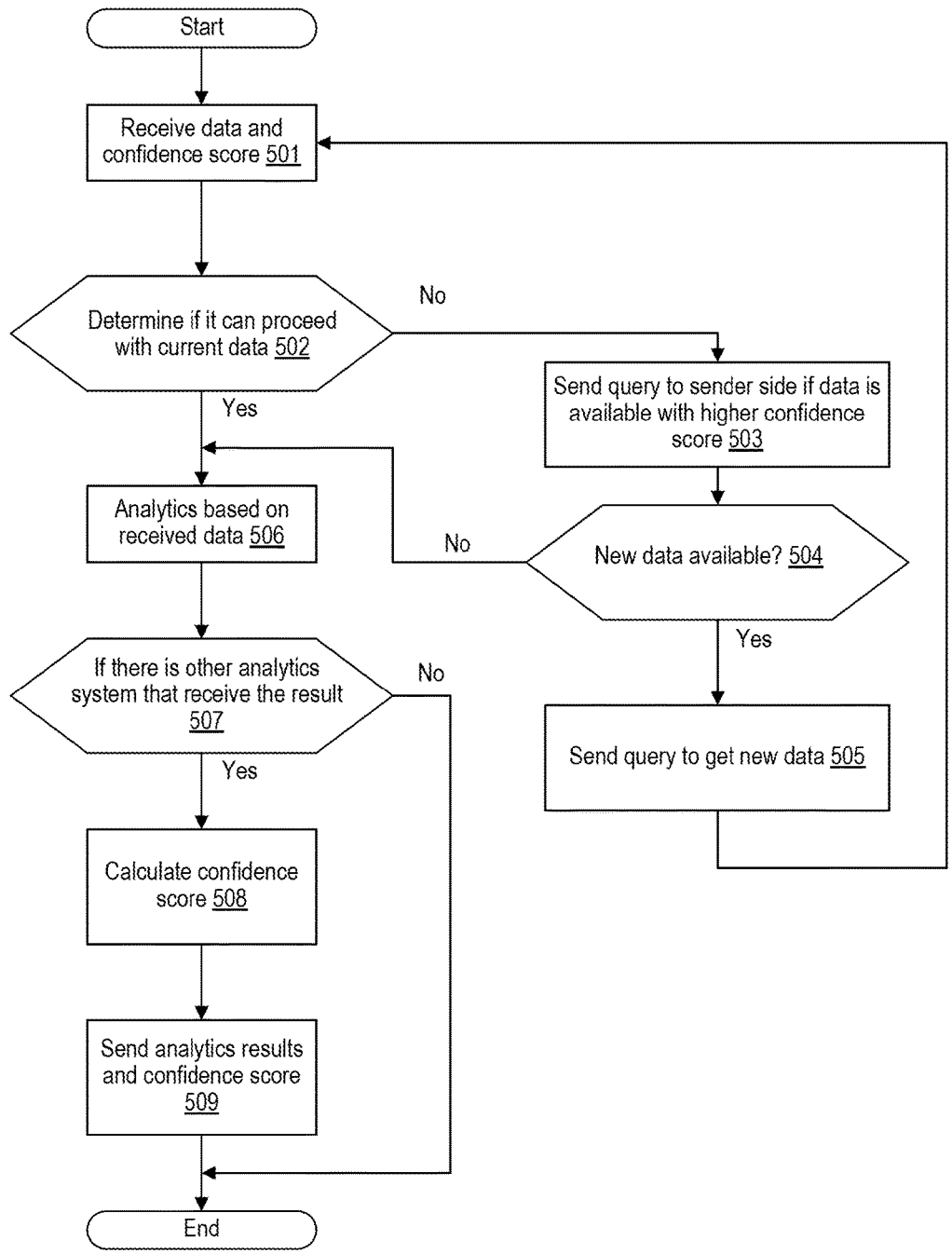
FIG. 5 illustrates a flow diagram for the receiver-side analytics system, in accordance with an example implementation.

FIG. 5 illustrates a flow diagram for the receiver-side analytics system, in accordance with an example implementation. At 501, the flow receives data and, if available, a confidence score for the data. At 502, a check is performed if it can proceed with current data. When the current received data is not sufficient for the analytics (no), the flow proceeds to 503, wherein the systems send queries to the analytics system asking if new data with higher confidence score is available. At 504, if new data with higher confidence score is available (yes) then the flow proceeds to 505 to send a request obtaining the data with the higher confidence score, otherwise (no), the flow proceeds to 506 with the present data. At 506, analytics are based on the received data. At 507, a check is performed to determine if there are other analytics system that receive the result. If so (yes), then the flow proceeds to 508, otherwise (no), the flow ends. At 508, the flow calculates the confidence score, and at 509, the analytics and the confidence score are sent. In example implementations, the flow can skip the first query to check for new data when a higher score is available. The flow can request new data which may result in the same data with the same confidence score.

Figure 6A:
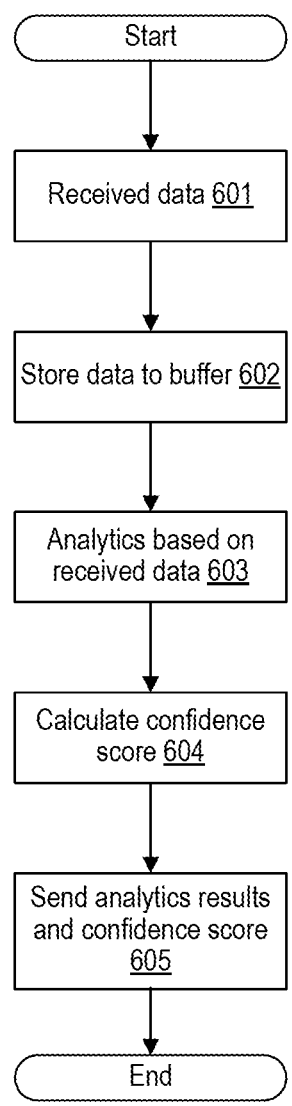
FIG. 6A illustrates a flow diagram for sender-side analytics system on data arrival, in accordance with an example implementation.
Figure 6B:
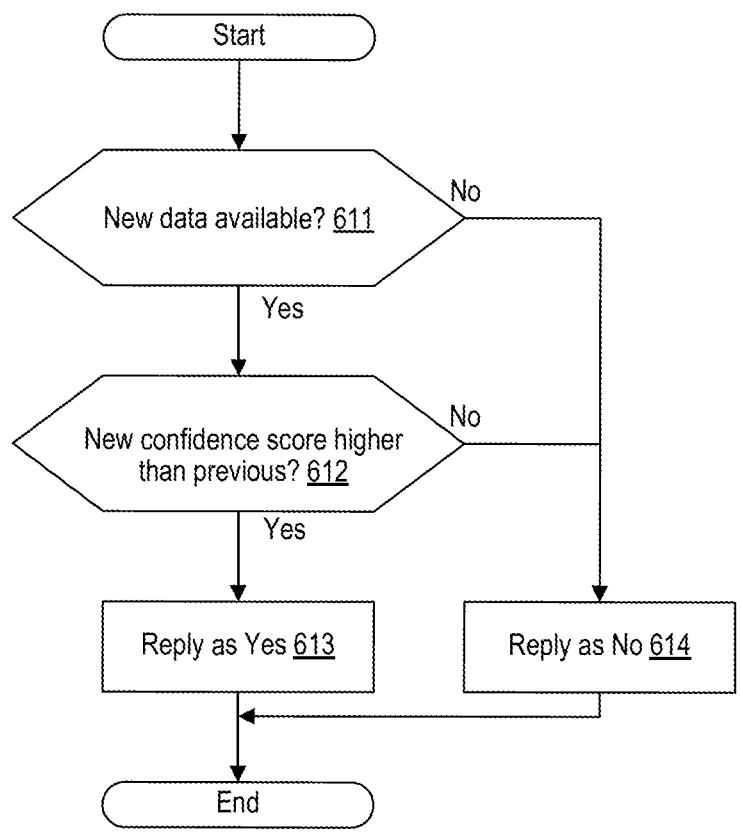
FIG. 6B illustrates a flow diagram for the sender-side analytics system and query if new data is available, in accordance with an example implementation.
Figure 6C:
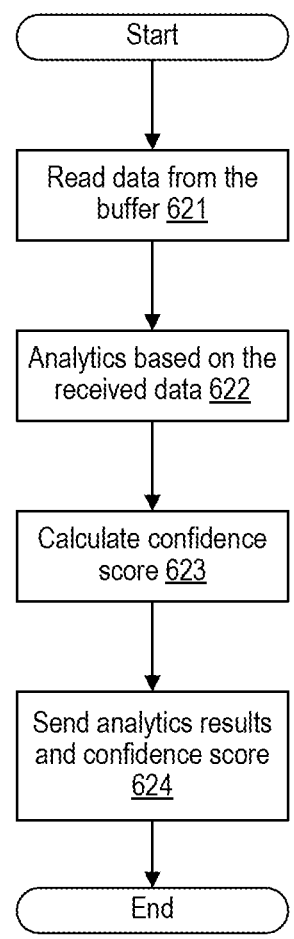
FIG. 6C illustrates a flow diagram for the sender-side analytics system and a query for the updated data, in accordance with an example implementation.

FIG. 6A illustrates a flow diagram for sender-side analytics system on data arrival, in accordance with an example implementation. In the example of FIG. 6A, the flow stores received data to the buffer for a later use, in addition to analytics, confidence score calculation, and sending to the other analytics system. At 601, the data is received and processed. At 602, the flow stores the data to the buffer. At 603, analytics are conducted based on the received data. At 604, the flow calculates the confidence score for the data based on the desired implementation. At 605, the flow sends analytics and the confidence score. FIG. 6B illustrates a flow diagram for the sender-side analytics system and query if new data with a higher confidence score is available, in accordance with an example implementation. At 611, the flow determines if additional data is received and stored in buffer after the data is sent. If so (yes), then the flow proceeds to 612 to determine if the new confidence score is higher than the previous score. If so (yes) then the flow proceeds to 613 to reply as yes. If any are false (no), then the flow proceeds to 614 to reply no. FIG. 6C illustrates a flow diagram for the sender-side analytics system and a query for the updated data, in accordance with an example implementation. Specifically, FIG. 6C illustrates the flow diagram of sender-side analytics system on query for getting updated data. The system reads data from buffer which stores received data, analyzes and calculates confidence score based on the data, and then send the data. At 621, the flow reads data from the buffer. At 622, analytics are conducted based on received data. At 623, the confidence score is calculated. At 624, the analytics results and confidence score are sent.

In an example implementation, there is the variation of flows to send updated data with a new confidence score. Example implementations described above are directed to pulling data initiated by receiver side. In the following example implementation, pushing data initiated by the sender side is described.

Figure 7:
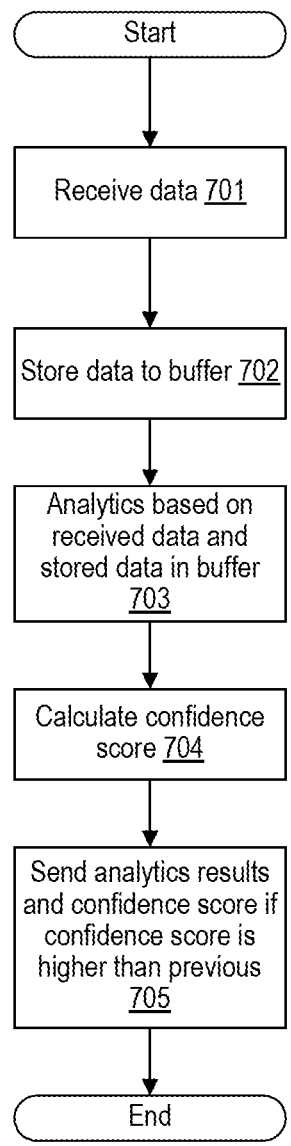
FIG. 7 illustrates a flow diagram of sender-side analytics system to send updated data, in accordance with an example implementation.

FIG. 7 illustrates a flow diagram of sender-side analytics system to send updated data with an updated confidence score, in accordance with an example implementation. In the flow as illustrated in FIG. 7, at 701, the flow receives new data, whereupon the flow stores the data to buffer at 702. At 703, the flow updates the analytics and confidence score based on the arrived data and the data stored in buffer. At 704, the confidence score is calculated. If the new confidence score is higher than previous one, the flow at 705 sends the updated data and confidence score.

Figure 8:
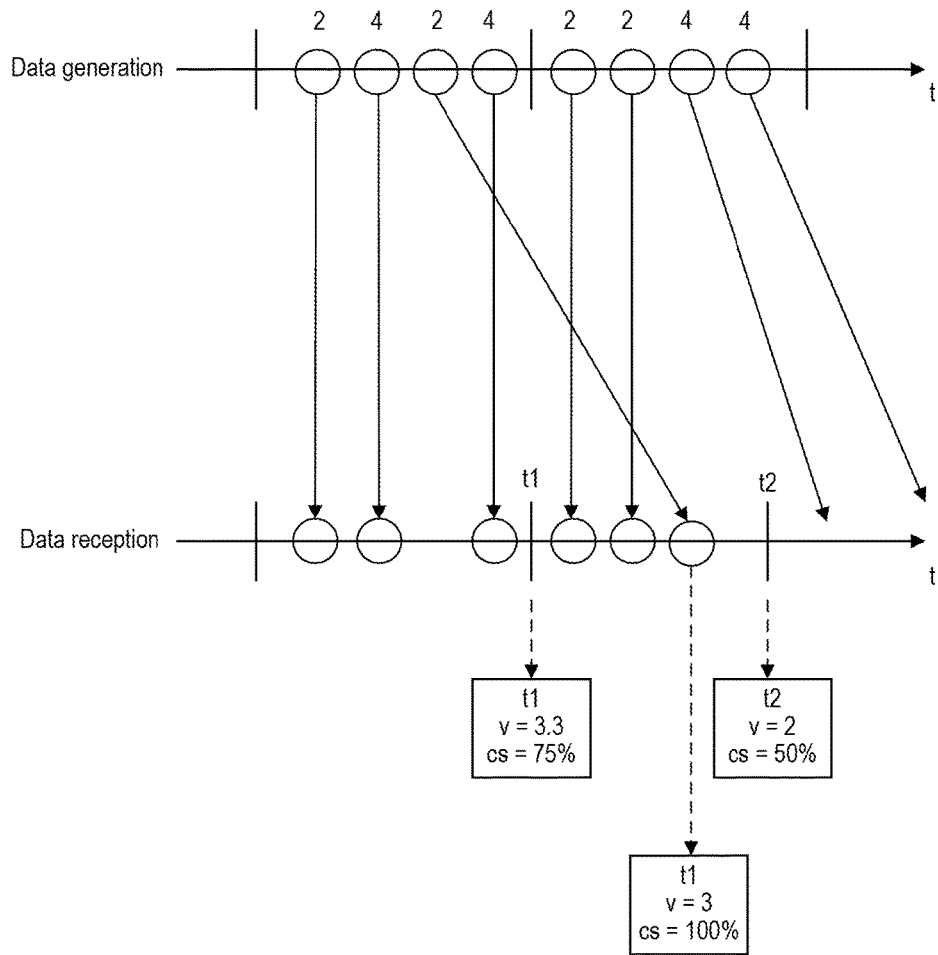
FIG. 8 illustrates an example of sender-side analytics system to send updated data, in accordance with an example implementation.

FIG. 8 illustrates an example of sender-side analytics system to send updated data, in accordance with an example implementation. In the example as illustrated in FIG. 8, there is an example of sender-side analytics system to send updated data shown in FIG. 7. In this example, streaming data is utilized, so data has timestamp and analytics results are for certain time period. Therefore, the condition "new confidence score is higher than previous one" applies for same time period. The result for different time period will be sent even if confidence score is not higher than one previously sent for another time period.

Figure 9:
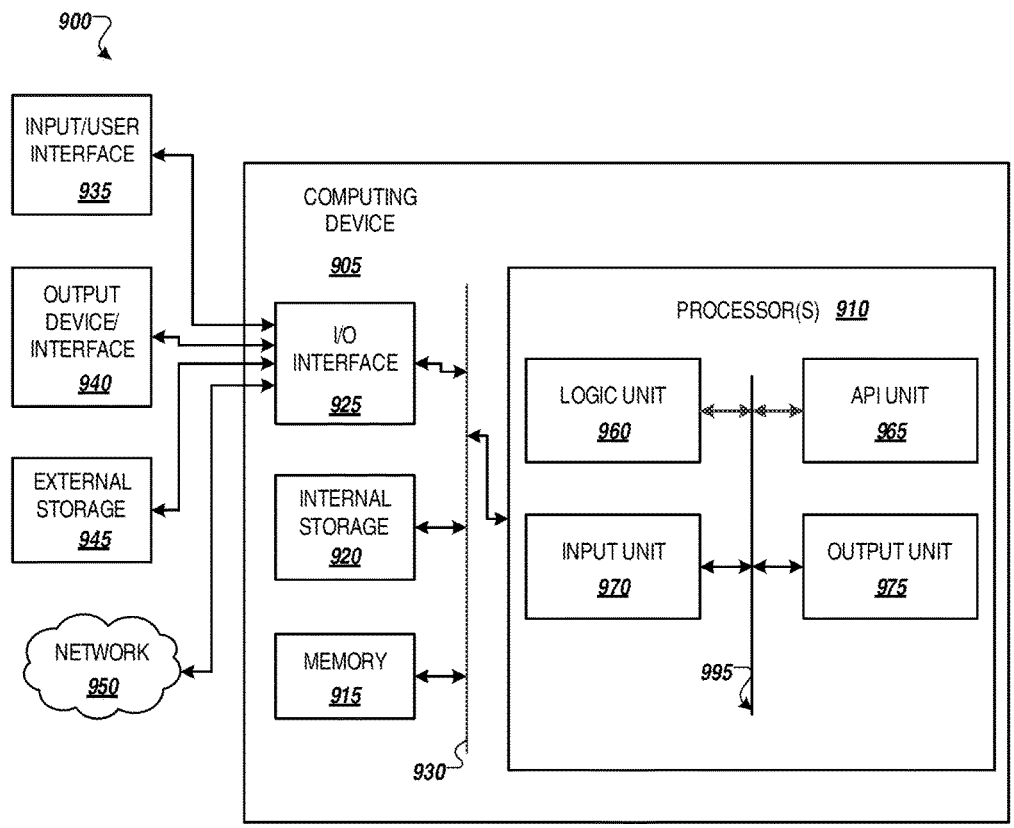
FIG. 9 illustrates an example computing environment with an example computer device suitable for use in some example implementations.

FIG. 9 illustrates an example computing environment with an example computer device suitable for use in some example implementations, such as a network operation center to facilitate the functionality of managing analytics for a system of base stations (BS) and user equipment (UE). Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

I/O interface 925 may be configured to receive information associated with a radio access network (RAN) and to communicate with the RAN, including the base stations and associated UEs. Memory 915 is configured to store information relating the one or more UEs to one or more RAN related metrics based on the information received through the I/O interface 925.

Memory 915 can further include a buffer to receive data from managed base stations. The data from the base stations can be streamed into the buffer so that analytics can be conducted in real time, or can be dedicated storage devices storing data from the base station for more complex analytics, such as determination of interference between managed base stations. Processor(s) 910 can be configured to conduct analytics on the data stored in the memory 915. In example implementations, the analytics can be conducted by processor(s) 910 once a confidence score exceeding a desired threshold is reached. If the confidence score does not meet the threshold, processor(s) 910 can send a query to managed base stations for availability of data having a higher threshold.

Figure 10:
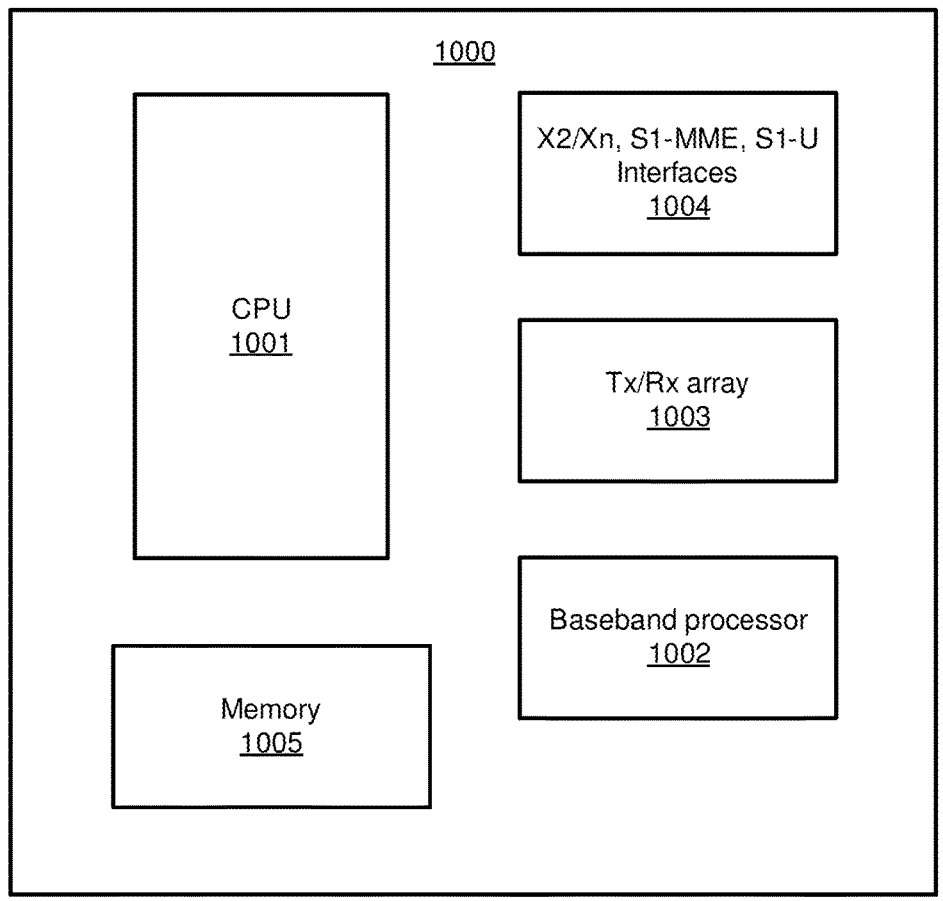
FIG. 10 illustrates an example base station upon which example implementations can be implemented.

FIG. 10 illustrates an example base station upon which example implementations can be implemented. The block diagram of a base station 1000 in the RAN of the example implementations is shown in FIG. 10, which could be a macro base station, a pico base station, an enhanced node B (eNodeB) and so forth. The base station 1000 may include the following modules: the Central Processing Unit (CPU) 1001, the baseband processor 1002, the transmission/receiving (Tx/Rx) array 1003, the X2/Xn, S1-MME, and S1-U interfaces 1004, and the memory 1005. The CPU 1001 is configured to execute one or more flows as described, for example, in FIG. 5 to conduct analytics on data received by user equipment and to forward data to the network operating center as described in FIG. 9.

The baseband processor 1002 generates baseband signaling including the reference signal and the system information such as the cell-ID information. The Tx/Rx array 1003 contains an array of antennas which are configured to facilitate communications with associated UEs. The antennas may be grouped arbitrarily to form one or more active antenna ports. Associated UEs may communicate with the Tx/Rx array to transmit signals containing analytics results on data received from managed UEs, and base station information such as congestion information, flow traffic information, and so forth. The X2/Xn interface 1004 is used to exchange traffic and interference information between one or more base stations, and S1-MME & S1-U interfaces are used to exchange information with the network operating center of FIG. 9 to transmit analytics results and/or base station reports. The memory 1005 can be configured to store and manage traffic information, traffic load, and so forth.

Memory 1005 may take the form of a computer readable storage medium or can be replaced with a computer readable signal medium as described below. Memory 1005 may also include a buffer to receive streamed data from managed UEs. Such streamed data can include analytics results from the managed UEs.

CPU 1001 may be configured to conduct analytics on the streamed analytics results for an analytics condition of the streamed first analytics results being met to generate additional analytics results. The analytics condition can include at least one of a confidence score (e.g. data rate) that meets a threshold according to the desired implementation, and a requirement for the receipt of all data required for the analytics, according to the desired implementation. For example, analytics directed to the throughput of the base station based on all managed UEs can be conducted on throughput information without waiting for information that is not necessary for the throughput analytics, such as UE IDs and handover information.

CPU 1001 can also be configured to determine if another apparatus is to receive the additional analytics results, such as another base station or the network operation center of FIG. 9, and for a determination that the another apparatus is to receive the second analytics results, CPU 1001 can be configured to calculate another confidence score for the second analytics results and transmit the another confidence score and the second analytics results to the third apparatus. Further, for the analytics condition of the streamed first analytics results not being met, CPU 1001 can be configured to send a query to the one or more managed UEs or data received from another base station for a request for data having a higher confidence score than the received confidence score.

Figure 11:
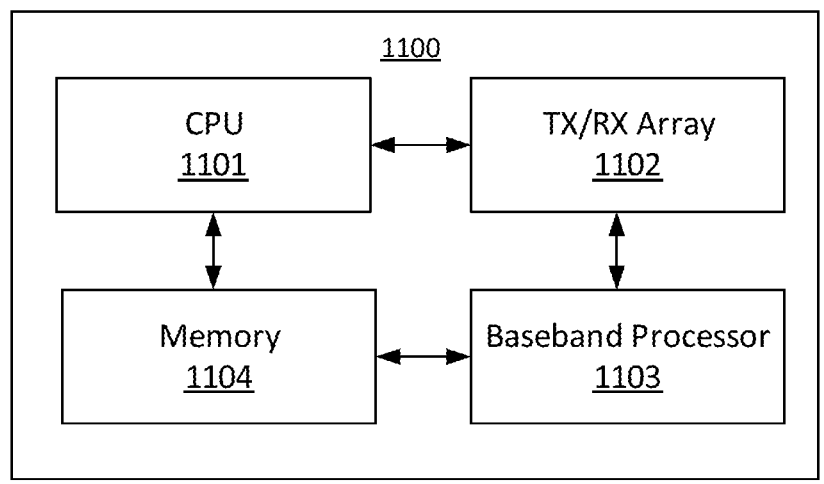
FIG. 11 illustrates an example user equipment upon which example implementations can be implemented.

FIG. 11 illustrates an example user equipment upon which example implementations can be implemented. UE can be implemented in the form of devices communicating with the associated base station or to other UEs, such as laptops, mobile devices, and so on. UEs can also be implemented as connected car through the use of a Long Term Evolution (LTE) chipset.

The UE 1100 may involve the following modules: the CPU module 1101, the Tx/Rx array 1102, the baseband processor 1103, and the memory 1104. The CPU module 1101 can contain one or more physical processors configured to perform one or more functions, such as execution of the flows as described, for example, in FIGS. 6A to 6C and FIG. 7 to conduct analytics on data and to have data streamed to another apparatus, such as the serving base station, or another UE (e.g. another car in a network of cars such as GPS information, vehicular status information, and so on). The Tx/RX array 1102 may be implemented as an array of one or more antennas to communicate with the one or more base stations. The memory 1104 can be configured to store UE related information such as congestion information and flow traffic. The baseband digital signal processing (DSP) module can be configured to perform one or more functions, such as to conduct measurements to generate the position reference signal for the serving base station to estimate the location of the UE.

As illustrated in FIGS. 6A to 6C and FIG. 7, CPU module 1101 is configured to conduct analytics on received streamed data to produce analytics results; calculate a confidence score for the first analytics results based on the received streamed data; and stream the first analytics results and the confidence score of the first analytics results to a second apparatus. The second apparatus may be in the form of another UE, the serving base station as illustrated in FIG. 10, or a network operation center as illustrated in FIG. 9. The confidence score utilized in the analytics can involve a data arrival rate of the data received by the UE.

Streamed data received by baseband processor 1103 can be stored to store the received streamed data in a buffer in memory 1104. CPU module 1101 can be configured to conduct the analytics on the received streamed data from the buffer to produce the analytics results. Further, in response to a query from the second apparatus, CPU module 1101 may be configured to respond to the base station based on a determination on availability of new streamed data and an availability of a higher confidence score than the calculated confidence score, as illustrated in FIGS. 6A to 6C and FIG. 7. For subsequent analytics results conducted on newly streamed data having a higher confidence score than the calculated confidence score, CPU module 1101 may be configured to transmit the subsequent analytics results and the higher confidence score to the second apparatus.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system, comprising:
    one or more first apparatuses, each of the one or more first apparatuses comprising a first processor configured to:
    conduct analytics on received streamed data to produce first analytics results;
    calculate a confidence score for the first analytics results based on the received streamed data, the confidence score indicative of whether second analytics can be conducted on the first analytics results to produce second analytics results within a level of accuracy; and
    stream the first analytics results and the confidence score of the first analytics results to a second apparatus;
    the second apparatus, comprising:
    a second processor, configured to:
    conduct the second analytics on the streamed first analytics results for an analytics condition of the streamed first analytics results being met, to generate the second analytics results; and
    for the analytics condition of the streamed first analytics results not being met, send a query to the one or more first apparatuses for data having a higher confidence score than the first confidence score.

2. The system of claim 1, wherein the analytics condition comprises at least one of: a confidence score that meets a threshold, and receipt of all data required for the analytics.

3. The system of claim 1, wherein the second processor is configured to receive updates to the streamed analytics results and to update the confidence score for the confidence score of the streamed analytics results not meeting a threshold.

4. The system of claim 1, wherein the confidence score comprises a data arrival rate.

5. The system of claim 1, wherein the one or more first apparatuses and the second apparatus comprises at least one of a user equipment and a base station.

6. The system of claim 1, wherein the second processor is configured to:
    determine if a third apparatus is to receive the second analytics results;
    for a determination that the third apparatus is to receive the second analytics results, calculate another confidence score for the second analytics results and transmit the another confidence score and the second analytics results to the third apparatus.

7. The system of claim 1, wherein the one or more first apparatuses are configured to store the received streamed data in a buffer and conduct the analytics on the received streamed data from the buffer to produce the first analytics results;
    wherein in response to a query from the second apparatus, the first processor is configured to respond to the second apparatus based on a determination on availability of new streamed data and an availability of a higher confidence score than the calculated confidence score.

8. The system of claim 1, wherein the one or more first apparatuses are configured to store the received streamed data in a buffer and conduct the analytics on the received streamed data from the buffer to produce the first analytics results;
    wherein for subsequent analytics results conducted on newly streamed data having a higher confidence score than the calculated confidence score, transmit the subsequent analytics results and the higher confidence score to the second apparatus.

9. A method, comprising:
    for one or more first apparatuses:
    conducting analytics on received streamed data to produce first analytics results;
    calculating a confidence score for the first analytics results based on the received streamed data, the confidence score indicative of whether second analytics can be conducted on the first analytics results to produce second analytics results within a level of accuracy; and
    streaming the first analytics results and the confidence score of the first analytics results to a second apparatus;
    for the second apparatus:
    conducting the second analytics on the streamed first analytics results for an analytics condition of the streamed first analytics results being met to generate the second analytics results; and
    for the analytics condition of the streamed first analytics results not being met, sending a query to the one or more first apparatuses for data having a higher confidence score than the first confidence score.

10. The method of claim 9, wherein the analytics condition comprises at least one of: a confidence score that meets a threshold, and receipt of all data required for the analytics.

11. The method of claim 9, further comprising, for the second apparatus, receiving updates to the streamed analytics results and to update the confidence score for the confidence score of the streamed analytics results not meeting a threshold.

12. The method of claim 9, wherein the confidence score comprises a data arrival rate.

13. The method of claim 9, wherein the one or more first apparatuses and the second apparatus comprises at least one of a mobile device and a base station.

14. The method of claim 9, further comprising, for the second apparatus:
- determining if a third apparatus is to receive the second analytics results;
- for a determination that the third apparatus is to receive the second analytics results, calculating another confidence score for the second analytics results and transmitting the another confidence score and the second analytics results to the third apparatus.

* * * * *